Feb. 13, 1962     F. LANDBRECHT     3,020,815
SINGLE LENS REFLEX CAMERA

Filed Aug. 5, 1959     3 Sheets-Sheet 1

INVENTOR.
FRANZ LANDBRECHT
BY

INVENTOR
FRANZ LANDBRECHT
BY Michael S. Striker
ATTORNEY

Feb. 13, 1962 F. LANDBRECHT 3,020,815
SINGLE LENS REFLEX CAMERA
Filed Aug. 5, 1959 3 Sheets-Sheet 3

INVENTOR.
FRANZ LANDBRECHT

United States Patent Office 3,020,815
Patented Feb. 13, 1962

3,020,815
SINGLE LENS REFLEX CAMERA
Franz Landbrecht, Munich, Germany, assignor to Agfa Aktiengesellschaft, Leverkusen-Bayerwerk, Germany
Filed Aug. 5, 1959, Ser. No. 831,738
Claims priority, application Germany Aug. 6, 1958
11 Claims. (Cl. 95—42)

The present invention relates to cameras and more particularly to single lens reflex cameras.

In particular, the present invention deals with the structure for controlling the movement of a reflector and light shield in such a camera.

In cameras of the above type the reflector is conventionally movable from a viewing position where it reflects an image of the subject up through the viewfinder to an exposure position where the reflector is located adjacent to the viewfinder away from the optical axis along which the light rays move to the film to expose the latter, and also a light shield is provided which shields the film from light rays during viewing of the subject through the viewfinder, and this light shield turns also to an exposure position providing access of the light to the film during exposure thereof. Thus, during exposure of the film the reflector is maintained in a light-tight condition in the camera while during viewing of the film the light shield is maintained in a light-tight condition in the camera, and it is conventional to rely on springs for holding both the reflector and the light shield in their light-tight conditions. There is a serious disadvantage with this conventional arrangement in that it is only necessary to overcome the yieldable force of the springs in order to destroy the light-tightness and as a result it is possible for vibrations or rebounding of the reflector or shield to overcome the force of the springs and thus interrupt the light-tightness and undesirably produce vignetting.

A primary object of the present invention is to provide a camera of the above type wherein the reflector is maintained in a vibration-proof manner in its light-tight condition so that the above drawbacks will be avoided.

It is also an object of the present invention to provide a structure which will maintain the light shield of the camera in a vibration-proof manner in its light-tight condition.

A further object of the present invention is to provide a relatively simple structure which will reliably operate on the reflector and light shield to move the latter in a predetermined sequence as well as to maintain the latter in their light-tight conditions in a vibration-proof manner.

It is a further object of the present invention to provide a structure of the above type which can be easily adjusted in order to regulate in a very accurate manner the positions of the reflector and light shield when they are in their light-tight conditions.

With the above objects in view the invention includes a reflex camera, a reflector which is movable from a viewing position where it reflects an image through the viewfinder and where it intersects the optical axis to an exposure position where it is spaced from the optical axis while an exposure is made. A means cooperates with the reflector when it is in its exposure position in a light-tight manner, and in accordance with the present invention a means is provided for releasably maintaining the reflector in a vibration-proof manner in its exposure position. In the same way, a light shield of the camera is movable between a light shielding position and an exposure position, this shield shielding the film from light rays during viewing of the image through the viewfinder and exposing the film when the shield is in its exposure position. When in its shielding position the light shield operates also with a structure which maintains it light-tight, and in accordance with the invention a means is provided for maintaining this light shield in a vibration-proof manner in its shielding position. As a result, with the structure of the invention it is impossible for any rebounding of the reflector or light shield or for any vibrations which act on the reflector or light shield to move either of these components from their light-tight conditions, and thus the above-discussed disadvantages of the conventional cameras are avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
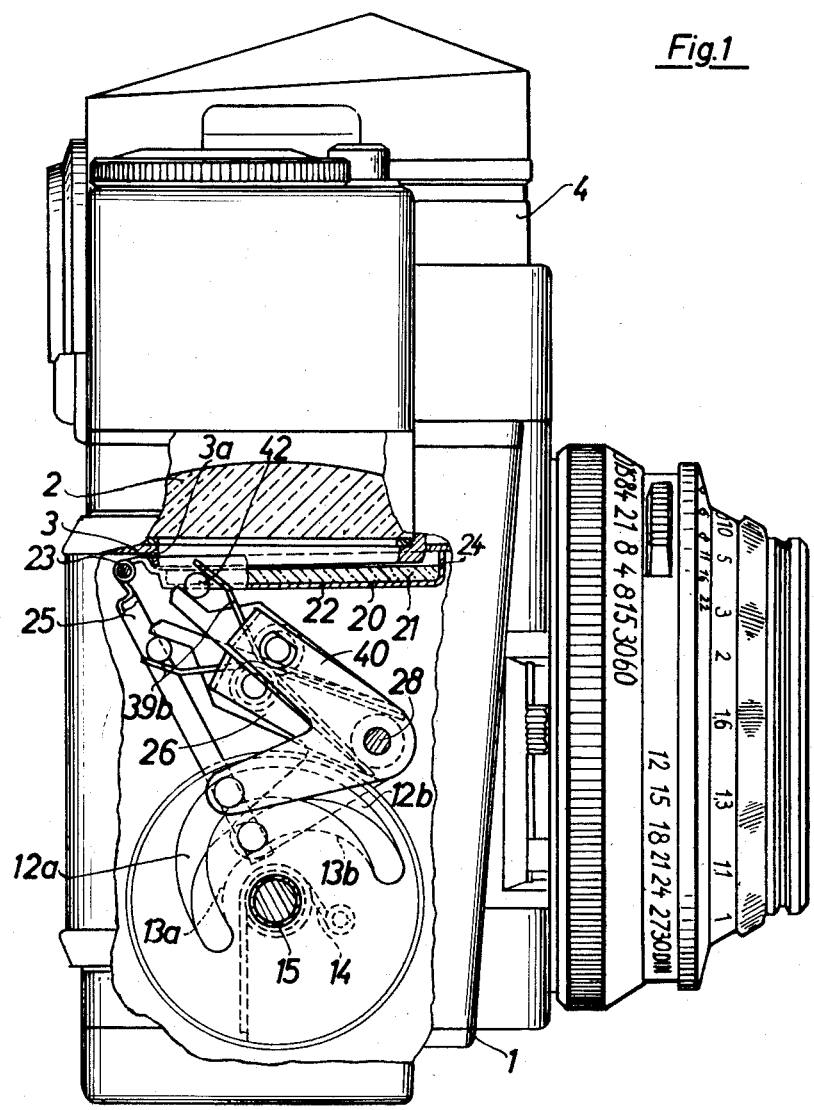
FIG. 1 is a side elevation, partly in section, of a camera which includes the structure of the invention.

Referring now to FIG. 1 of the drawings, the housing 1 of a single lens reflex camera is illustrated therein, this camera having a central shutter. The camera includes a viewfinder which includes the glass element 2 made of frosted glass, this viewing element 2 of the viewfinder being carried by an upper intermediate wall 3 of the camera housing. An interchangeable penta-prism is also illustrated in FIG. 1.

A chamber for a reflector is formed in part by a pair of parallel vertical walls 5 and 6 (FIGS. 2 and 3), a lower intermediate wall 7, the rear wall 8, which is located at the left in FIG. 1, and the upper intermediate wall 3. A moving means is provided for moving the reflector which is referred to below, and this moving means includes a rotary shaft 9 which is turnably carried by the walls 5 and 6. This rotary shaft 9 is capable of being coupled in a known way with the film transporting structure and can be held in an end position by a locking structure which is released when making an exposure so that from the turning shaft 9 all of the functions necessary for making the exposure can be controlled, these functions being the contraction of the diaphragm to the preselected value of the aperture, the closing of the shutter blades, the retraction of the reflector from its viewing position intersecting the optical axis to its exposture position, and then the retraction of the light shield from its shielding position to its exposure position and finally the release of the shutter.

Figure 2:
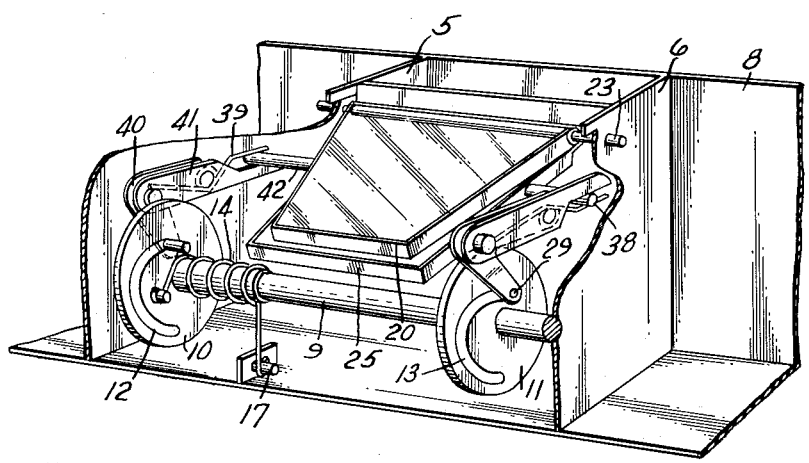
FIG. 2 is a fragmentary perspective illustration of the reflector and light shield and the structure which cooperates therewith.
Figure 3:
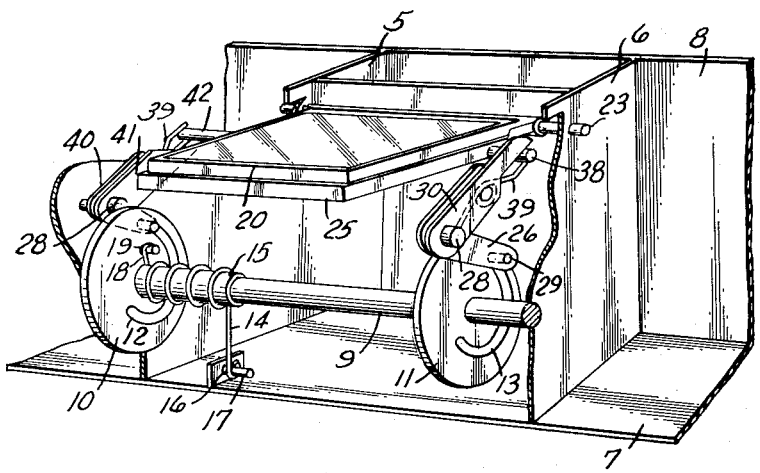
FIG. 3 shows the structure of FIG. 2 in a different position.

This moving means includes in addition to the rotary shaft 9 a cam means which is made up of a pair of discs 10 and 11 which are fixed to the shaft 9 for rotation therewith and which are provided with camming cutouts 12 and 13 of the configuration shown in FIGS. 1–3. A coil spring 14 (FIGS. 2 and 3), is coiled about a sleeve 15 which is freely turnable on the shaft 9, the latter passing through the sleeve 15. One of the ends 16 of the coil spring 14 is fixed to a stationary pin 17 of the camera, while the other end 18 of the spring 14 is fixed to a pin 19 which is carried by the disc 10.

The reflector 20 of the camera illustrated in the drawings is provided with a suitably silvered glass sheet 21 (FIG. 1) which is held by a frame 22. This frame 22 is turnably carried by a stationary shaft 23 which is itself carried by the walls 5 and 6 and which is parallel to the shaft 9. As is apparent from FIG. 1, the frame 22 has a peripheral portion 24 extending beyond the upper face of the reflector as viewed in FIG. 1, and the intermediate wall 3 is provided with a downwardly directed flange 3a surrounding the opening of the wall 3 which is covered by the frosted glass viewing element 2. Thus, when the reflector is in the position illustrated in FIG. 1 the flange 3a is surrounded by the peripheral portion 24 of the frame 22, and this peripheral portion 24 engages the under surface of the wall 3, as indicated in FIG. 1, so that in this way the flange 3a and the peripheral portion 24 of the frame 22 form a means for maintaining the reflector 20 in a light-tight manner when this reflector 20 is in the exposure position thereof illustrated in FIG. 1.

The light shield 25 of the camera illustrated in the drawings also is turnably carried by the shaft 23 so that the light shield 25 and the reflector 20 have a common turning axis and in fact sweep through substantially the same space. The light shield 25 is shown in FIG. 1 in its lower shielding position where it cooperates in a light-tight manner with a frame which is not shown for the sake of clarity, and in this way in the shielding position shown in FIG. 1 the light shield 25 prevents any light from reaching the film. Thus, FIG. 1 illustrates an intermediate position of the camera where the reflector as well as the light shield are both in their light-tight conditions. When, during making of an exposure, the shaft 9 is released from its unillustrated locking mechanism, the reflector 20 moves from the viewing position thereof which is illustrated in FIG. 2 and in which the reflector 20 intersects the optical axis to reflect an image of the subject up to the glass element 2 of the viewfinder in a counterclockwise direction, as viewed in FIG. 1, around the shaft 23 up to the exposure position of the reflector 20 which is illustrated in FIG. 1. It is only at the end of this turning movement of the reflector 20 that the light shield 25 moves from the position thereof illustrated in FIG. 1 to that illustrated in FIG. 3 where the reflector 20 as well as the light shield 25 are both in their exposure positions located over the optical axis next to the wall 3 so that the film can now be exposed according to the operation of the shutter. The reverse of these operations takes place during transportation of the film in preparation for the next exposure. Thus, at this time the light shield 25 will first turn in a clockwise direction around the shaft 23, as viewed in FIG. 1, from the upper position illustrated in FIG. 3 to the shielding position illustrated in FIG. 1, and after the shield 25 reaches its shielding position the reflector 20 will turn downwardly from its upper exposure position to the viewing position thereof illustrated in FIG. 2.

The means for moving the shield between its positions includes in addition to the cam 11 a bell crank 26 which is turnably supported by a sleeve 27 and a screw 28 which cooperates with the sleeve 27 to hold the latter on a wall of the camera such as wall 6. This structure is shown most clearly in FIG. 4. The bell crank 26 fixedly carries a pin 29 which extends parallel to the turning axis of the bell crank, and this pin 29 extends into the camming cutout 13 of the cam 11. The sleeve 27 also turnably supports a one-armed lever 30 which thus has a turning axis common with that of the bell crank 26. The lever 30 carries a ring 31 which surrounds and is freely turnable on the sleeve 27 and which cooperates with the bell crank 26 to maintain the lever 30 and the bell crank 26 at a predetermined distance from each other on the sleeve 27.

Figure 4:
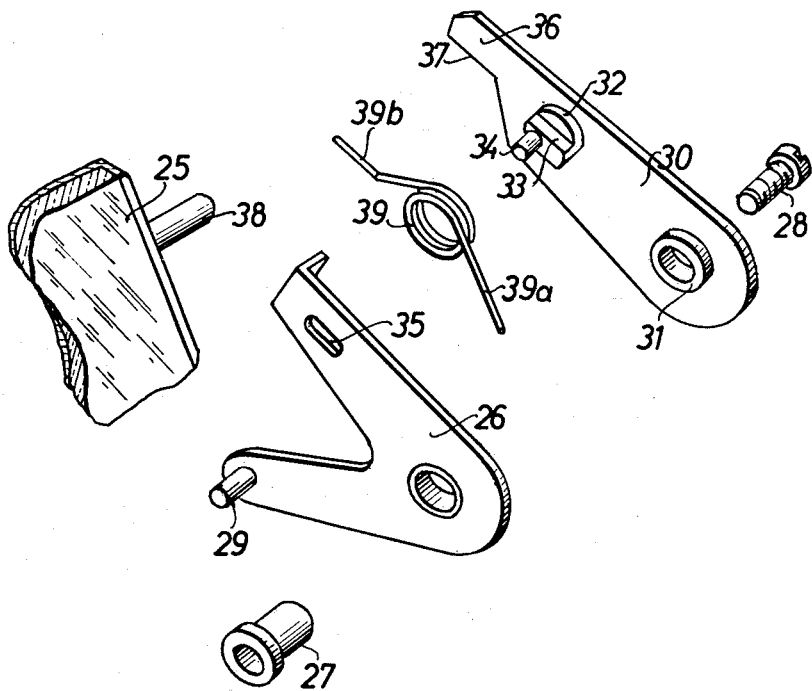
FIG. 4 is an exploded perspective view of a set of motion transmitting elements of the invention.

As may be seen from FIG. 4, a circular block 32 is turnably carried by the lever 30 in an opening thereof, and this block 32 is restrained by any suitable collars or the like against axial movement with respect to the lever 30. This block 32 carries a pin 34 whose axis is parallel to and spaced from the axis of the block 32 so that in this way the pin 34 is eccentrically mounted. The block 32 is provided with a pair of parallel surfaces 33 so that by application of a suitable wrench to these surfaces the block 32 can be turned so as to adjust the position of the pin 34. This pin 34 extends into the elongated slot 35 which is formed in the bell crank 26, and thus while the pin 34 serves to interconnect the levers 26 and 30 for turning movement together, the angular position of the block 32 can be adjusted so as to regulate the angular position of the levers 26 and 30 with respect to each other, and thus elements 32–34 form an eccentric pin means for this purpose. The block 32 has a fairly tight friction fit in the opening of the lever 30 so that the block 32 will remain in whichever angular position it is turned to by the operator.

The free end 36 of the lever 30 is provided with an elongated edge surface 37, and this edge surface 37 directly engages the pin 38 which is shown in FIG. 4 connected to the light shield 25. This pin 38 extends parallel to the shaft 23. The pin 38 is shown diagrammatically in FIG. 1 connected to the light shield 25, and it is apparent from FIG. 1 that the edge 37 of the free end 36 of the lever 30 engages an upper surface of the pin 38, as viewed in FIG. 1. It will be noted that this particular upper surface portion of the pin 38 trails during turning of the light shield 25 from its upper exposure position adjacent to the wall 3 down to its lower shielding position illustrated in FIG. 1. It is apparent that during turning of the cam 11, the cooperation of the latter through the groove 13 and pin 29 with the bell crank 26 will provide turning of the latter together with the lever 30 and the light shield 25, and it will be noted that the entire moving means is made up of rigid elements exclusively for participating in the movement of the light shield 25 from its exposure position to its shielding position. A spring 39 is coiled around the block 32 and has a pair of free ends 39a and 39b respectively extending beneath the ring 31 and the pin 38. Thus, the free end 39b of the spring 39 cooperates with the pin 38 to maintain the latter against the surface 37 of the lever 30, and it will be noted that when the moving means turns the light shield 25 in a counterclockwise direction as viewed in FIG. 1, from the shielding to the exposure position thereof the moving means acts on the light shield 25 through the spring 39, while when the light shield 25 is returned to its shielding position it is acted on exclusively by the rigid elements and these rigid motion transmitting elements serve also to retain the shield 25 in its shielding position so that there is no possibility of vibrations, rebounding, or the like influencing the shield 25 so as to move the latter even momentarily away from its shielding position, and thus the film is reliably cut off from light while the operator views the subject in the viewfinder.

An identical set of motion transmitting elements cooperate with the cam 10 to form therewith a moving means for moving the reflector 20. Thus, the pin 42 which extends from a side of the reflector 20 distant from the pin 38 in a direction opposite to the pin 38 is acted on in the same way by a second spring 39, and the lever 41 shown in FIGS. 2 and 3 is identical with the lever 30 except that the lever 41 is turned through 180° with respect to the lever 30 so that the surface 37 of the lever 41 engages the underside of the pin 42 while the spring 39 engages the upper surface portion of the pin 42, and of course the end 39a of the spring 39 located between the bell crank 40 and the lever 41 engages the upper side of the ring 31 of the second set of motion transmitting elements, as is particularly evident from FIGS. 2 and 3. The bell crank 40 is identical with the bell crank 26 except that the pin of the bell crank 40 which corresponds to the pin 29 extends in the opposite direction toward the pin 29 so as to extend through the elongated cutout 12 of the disc 10. Inasmuch as bell cranks 41 and 26, on the one hand, and levers 41 and 30 on the other hand have identical constructions, it is possible for these elements to be manufactured with the same tools.

The relationship between the camming cutouts 12 and 13 is most clearly shown in FIG. 1. Thus, it will be seen that the cutout 12 includes an elongated cutout portion 12a and an elongated cutout portion 12b which forms an extension of the cutout portion 12a. As is apparent from FIG. 1 the cutout portion 12a is located at a gradually increasing radial distance from the axis of shaft 9 from the lower end of the cutout portion 12a toward the upper end thereof, as viewed in FIG. 1, while the cutout portion 12b is at a constant radius from the axis of the shaft 9. In the same way, the cutout 13 has a portion 13a and a portion 13b. The cutout portion 13a has a constant radial distance from the axis of the shaft 9, while the cutout portion 13b from its end next to the cutout portion 13a to its right free end, as viewed in FIG. 1, has a constantly increasing radial distance from the axis of the shaft 9. It will be noted that both of the cutouts extend through the same angular distance and furthermore that the cutout portion 13a extends through the same angular distance as and is aligned with the cutout portion 12a while the cutout portion 13b extends through the same angular distance as and is aligned with the cutout portion 12b. Thus, while the bell crank pins 29 are engaged by the cutout portions 12a and 13a, the pin engaged by the cutout portion 13a will not move because of the constant radial distance of the cutout portion 13a from the axis of the shaft 9, while the pin 29 engaged by the cutout portion 12a will turn toward or away from the axis of the shaft 9 due to the changing radial distance of the cutout 12a from the axis of the shaft 9, and this action is reversed when the pins 29 of the bell cranks are engaged by the cutout portions 12b and 13b. At this time the pin 29 engaged by the cutout portion 12b will not move because of the constant radial distance of the cutout portion 12b from the axis of the shaft 9, while on the other hand the variable radial distance of the cutout portion 13b from the axis of the shaft 9 will produce turning movement of the bell crank 26.

Referring to FIG. 1, it will be seen that when the free ends of the cutout portions 12a and 13a are located at the pins 29, the parts are in position illustrated in FIG. 2 where the subject may be seen in the viewfinder. Assuming now that an exposure is to be made, then during this time in a fully automatic manner the cams 10 and 11 will turn in a counterclockwise direction, as viewed in FIG. 1, and while the pins 29 are in engagement with the cutout portions 12a and 13a it is clear that the light shield 25 will remain in the position illustrated in FIG. 1 while the reflector 20 will at this time be turned up to the exposure position thereof, and at the end of the movement of the reflector to its exposure position the parts will have the position indicated in FIG. 1 where the ends of the cutouts 12a and 13a which respectively adjoin the cutout portions 12b and 13b have reached the pins 29. It is clear that during the subsequent counterclockwise turning of the cams as viewed in FIG. 1, the reflector 20 will remain in the illustrated position because of the constant radial distance of the cutout-portion 12b, while on the other hand the cutout portion 13b will at this time cooperate with the light shield 25 to turn the latter up to the position indicated in FIG. 3, and in this way the reflector and light shield are moved in sequence. Naturally, after the exposure is made the parts are returned to the position of FIG. 2, and during this time it is the light shield 25 which will first return to its position and then during clockwise turning of the cams, as viewed in FIG. 1, the reflector 20 will be returned to its viewing position illustrated in FIG. 2 by cooperation of the cutout portion 12a with the pin 29.

With this arrangement it is clear that by adjustment of the eccentric pins 34 the positions of the reflector and light shield when they are in their light-tight condition can be very accurately adjusted. Also, special locking devices are not required since it is sufficient if the shaft 9 is maintained by a suitable locking device in one of its end positions and if it is maintained in its other end position by the force of the spring 14 and a suitable stop.

In the event that it is desired to control additional elements from the rotary shaft 9, the camming cutouts 12 and 13 can be made longer and of course the added portions of these cutouts would be portions of circles whose centers are in the axis of shaft 9 so that there would be no change in the position of the light shield and reflector and this arrangement would only render it possible to turn the shaft 9 beyond the end positions thereof dictated by the length of the cutouts 12 and 13. However, it is also possible, instead of extending the cutouts 12 and 13, to carry out the several operations simultaneously. Thus, during the upward movement of the reflector 20 from its viewing to its exposure position, the shutter blades are closed and the diaphragm is contracted to the preselected value of the aperture. However, the light shield 25 remains in its lower shielding position at this time. Also the shutter is not yet released, since release of the shutter does not take place until the light shield 25 reaches its upper exposure position also. Therefore it is clear that the angular range of turning of the cams and the shaft 9 required for movement of the reflector and light shield suffices also for the control of all of the operations incident to the making of the successive exposures.

It will be noted that the reflector 20 also is maintained in its upper light-tight exposure position illustrated in FIG. 1 exclusively through rigid motion transmitting elements of the moving means, so that it is not possible for any rebounding, vibrations, or the like to cause movement of the reflector downwardly away from the wall 3 to undesirably influence the exposure.

Of course, the invention in its broadest aspects includes an arrangement where the free end 36 of the lever 30 is bifurcated to receive the pin 42 or the pin 38, and in such a construction the spring 39 would be omitted. However, a bifurcated structure of this type is not prefered since it does not have the accuracy of the construction illustrated where the free end 39b of this spring guarantees very close maintenance of the pins 42 or 39 against the surfaces 37. Thus, this latter structure because of its greater accuracy is preferred.

It will be understood that each of the elements described above, or two or more together, may also find a useful application in other types of cameras differing from the types described above.

While the invention has been illustrated and described as embodied in reflex cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a single lens reflex camera, in combination, a viewfinder located over the optical axis of the camera; a reflector movable between a viewing position where it intersects the optical axis to reflect an image to the viewfinder and an exposure position where the reflector is spaced from the optical axis while an exposure is made; means cooperating in a light-tight manner with said reflector when it is in said exposure position thereof; a light shield having a shielding position preventing light from having access to film which is to be exposed and also having an exposure position providing access of light along the optical axis to the film to expose the latter; and moving means cooperating with said reflector and light shield for first moving said reflector from said viewing to said exposure position thereof, for then moving said light shield from said shielding to said exposure position thereof, for thereafter returning said light shield from said exposure to said shielding position thereof, and for finally returning said reflector from said exposure to said viewing position thereof, said moving means maintaining said reflector in a rigid, vibration-proof manner in its exposure position and said light shield in a rigid, vibration-proof manner in its shielding position, said moving means including first and second rigid motion transmitting elements and acting exclusively through said first rigid motion transmitting elements on said reflector during movement of the latter from said viewing to said exposure position thereof and said moving means acting exclusively through said second rigid motion transmitting elements on said light shield during movement of the latter from said exposure to said light shielding position thereof.

2. In a single lens reflex camera, in combination, a viewfinder located over the optical axis of the camera; a reflector movable between a viewing position where it intersects the optical axis to reflect an image to the viewfinder and an exposure position where the reflector is spaced from the optical axis while an exposure is made; means cooperating in a light-tight manner with said reflector when it is in said exposure position thereof; a light shield having a shielding position preventing light from having access to film which is to be exposed and also having an exposure position providing access of light along the optical axis to the film to expose the latter; and moving means cooperating with said reflector and light shield for first moving said reflector from said viewing to said exposure position thereof, for then moving said light shield from said shielding to said exposure position thereof, for thereafter returning said light shield from said exposure to said shielding position thereof, and for finally returning said reflector from said exposure to said viewing position thereof, said moving means maintaining said reflector in a rigid vibration-proof manner in its exposure position and said light shield in a rigid vibration-proof manner in its shielding position, said moving means including first and second rigid motion transmitting elements and acting exclusively through said first rigid motion transmitting elements on said reflector during movement of the latter from said viewing to said exposure position thereof and said moving means acting exclusively through said second rigid motion transmitting elements on said light shield during movement of the latter from said exposure to said light shielding position thereof and said moving means also including first and second yieldable springs and actting at least in part through said first yieldable spring on said reflector during movement of the latter from said exposure to said viewing position thereof and at least in part through said second yieldable spring on said light shield during movement of the latter from said shielding to said exposure position thereof.

3. In a camera as recited in claim 2, said reflector being turnable about a given axis between said positions thereof and said moving means including a pin fixed to said reflector and extending parallel to said axis, said pin having a first surface portion which trails during turning of said reflector from said viewing to said exposure position thereof and said first motion transmitting elements including a motion transmitting element which engages said first surface portion of said pin, the latter having opposite to said first surface portion thereof a second surface portion which trails during turning of said reflector from said exposure to said viewing position thereof, and said first yieldable spring engaging said second surface portion of said pin.

4. In a camera as recited in claim 3, said light shield also being turnable about said axis and said moving means including a second pin fixed to said light shield and extending parallel to said axis, said second pin having a first surface portion which trails during turning of said shield from said exposure to said shielding position thereof and said second motion transmitting elements including an element which engages said first surface portion of said second pin, the latter having opposite to said first surface portion thereof a second surface portion which trails during turning of said light shield from said shielding to said exposure position thereof and said second spring engaging said second surface portion of said second pin.

5. In a camera as recited in claim 4, said reflector and light shield sweeping through substantially the same space during movement between said positions and being located next to each other in said exposure positions thereof as well as next to each other in the shielding position of said light shield and viewing position of said reflector.

6. In a camera as recited in claim 5, said first pin being fixed to one side of said reflector and extending away from the latter in one direction and said second pin being fixed to said shield at a side thereof distant from said first pin and extending away from said shield in a direction opposite to said one direction.

7. In a camera as recited in claim 2, said light shield being turnable about a given axis between said positions thereof and said moving means including a pin fixed to said shield and extending parallel to said axis, said pin having a first surface portion which trails during turning of said light shield from said exposure to said shielding position and said second motion transmitting elements including an element which engages said first surface portion of said pin, the latter having opposite to said first surface portion a second surface portion which trails during turning of said shield from said shielding to said exposure position and said second spring engaging said second surface portion of said pin.

8. In a camera as recited in claim 1, said moving means including a rotary shaft, a bell crank, cam means connected to said shaft to turn therewith and cooperating with said bell crank to turn the latter, a first pin fixed to said reflector, a lever engaging said first pin to act through the latter on said reflector and having a turning axis common with that of said bell crank, a second pin interconnecting said bell crank and lever for turning movement together, said shaft, bell crank, cam means, lever and pins constituting said first motion transmitting elements, and adjusting means for adjusting the position of said second pin so as to adjust the position of said bell crank and lever relative to each other.

9. In a camera as recited in claim 8, said adjusting means including eccentric means cooperating with said second pin for turning the latter around an axis parallel to the common turning axis of said bell crank and lever for adjusting the angular position of said bell crank and lever with respect to each other and for thus adjusting the exposure position of said reflector.

10. In a camera as recited in claim 8, said cam means including a disc fixed to said shaft to turn therewith and including an elongated camming cutout of predetermined configuration, said bell crank carrying a pin of said cam means which extends into said cutout.

11. In a camera as recited in claim 1, said moving means including a rotary shaft, a pair of camming discs fixed to said rotary shaft for rotation therewith and respectively including camming cutouts, and sets of motion transmitting elements cooperating respectively with said cutouts and said reflector and shield for transmitting turning of said discs to said reflector and shield, each cutout having a first portion whose radial distance from said shaft changes from one end to the other end of said first portion and a second portion extending from said first portion and having a constant radius, and the first portion of the cutout of each disc extending through the same angular distance as the second portion of the cutout of the other disc and being angularly aligned therewith.

References Cited in the file of this patent

UNITED STATES PATENTS

| | | |
|---|---|---|
| 2,579,247 | Angenieux | Dec. 18, 1951 |
| 2,730,025 | Faulhaber | Jan. 10, 1956 |

FOREIGN PATENTS

| | | |
|---|---|---|
| 1,153,459 | France | Oct. 7, 1957 |